H. J. FARMER.
LAWN MOWER.
APPLICATION FILED AUG. 16, 1915.
1,172,444.
Patented Feb. 22, 1916.
2 SHEETS—SHEET 1.
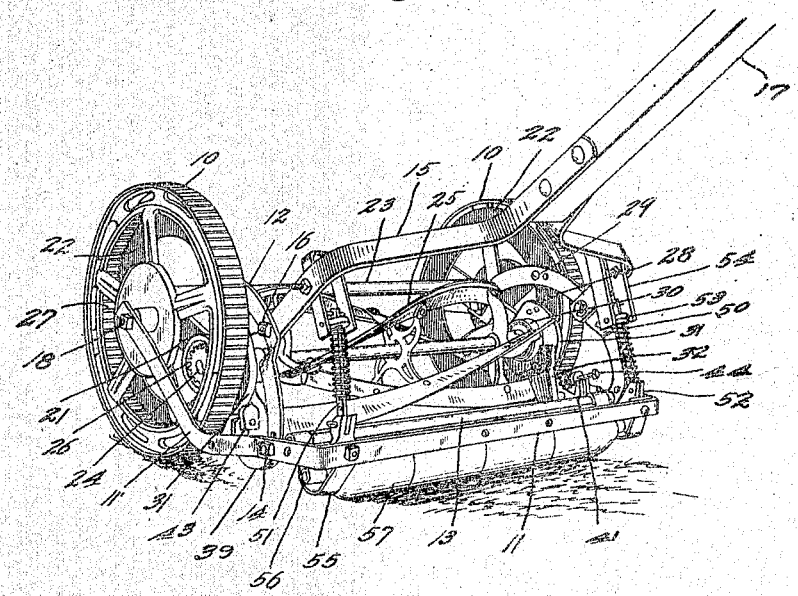
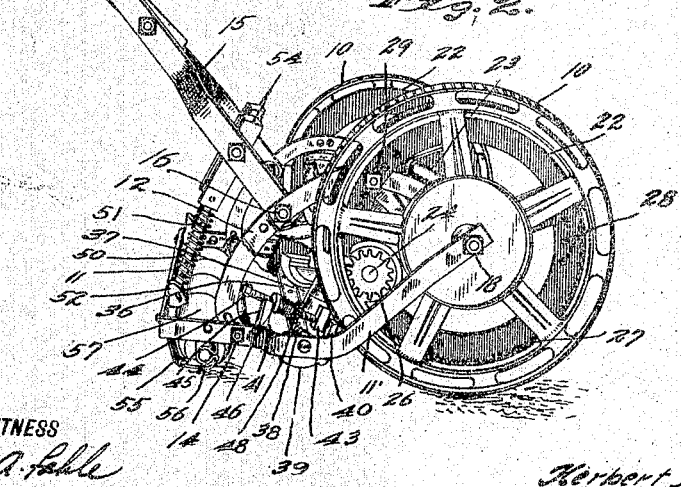
WITNESS
INVENTOR
Herbert J. Farmer
BY
ATTORNEYS

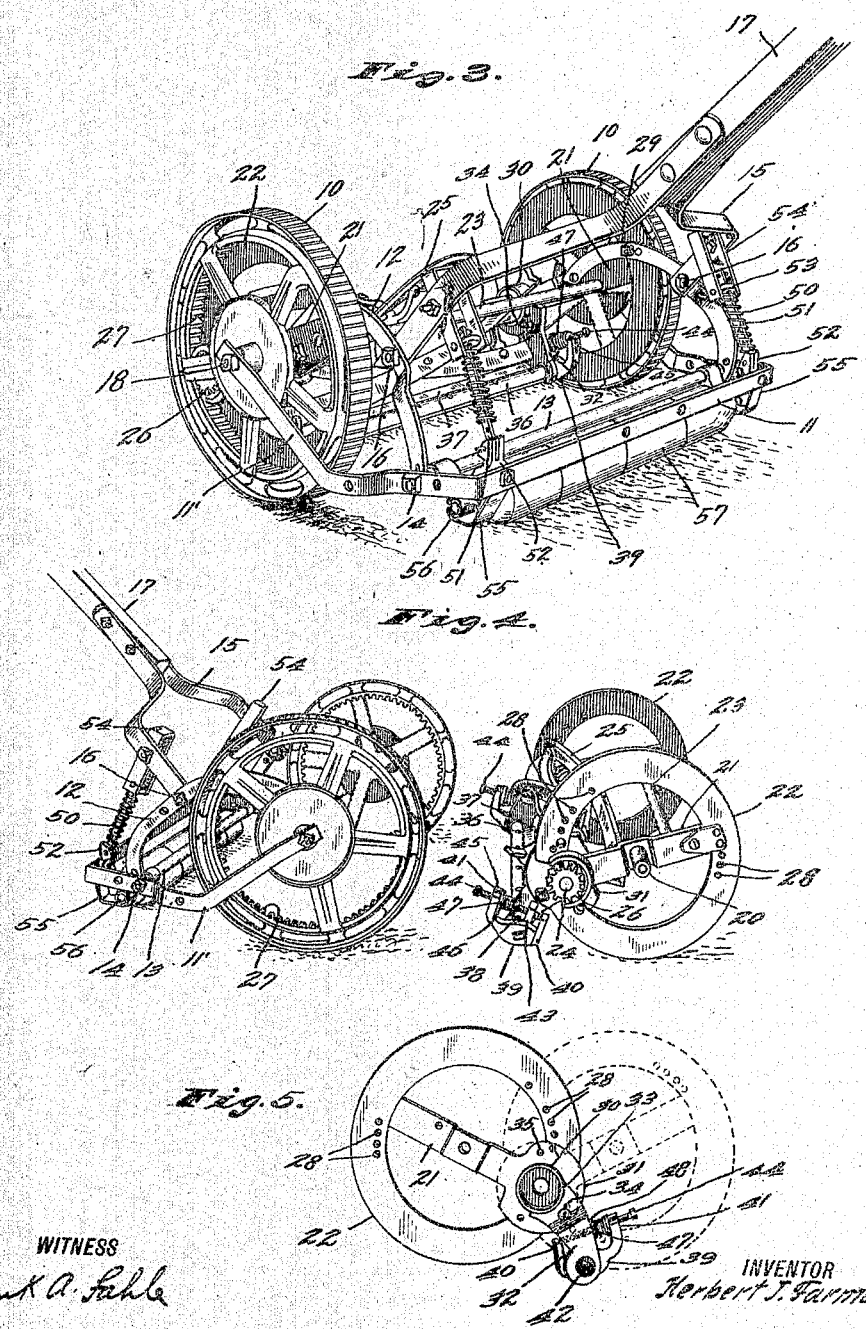

UNITED STATES PATENT OFFICE.

HERBERT J. FARMER, OF RICHMOND, INDIANA.

LAWN-MOWER.

1,172,444.   Specification of Letters Patent.   Patented Feb. 22, 1916.

Application filed August 16, 1915. Serial No. 45,646.

*To all whom it may concern:*

Be it known that I, HERBERT J. FARMER, a citizen of the United States, residing at Richmond, in the county of Wayne and State of Indiana, have invented a new and useful Lawn-Mower, of which the following is a specification.

It is the object of my invention to provide a lawn mower in which the cutting element may be assembled as a unit away from the frame, and may be adjusted in the frame for cutting grass to different lengths and for cutting either in advance of or behind the line where the driving wheels engage the ground; in which the cutter bar blade may be adjusted relatively to the cutting reel, and may be made to yield when obstacles are encountered or be set rigidly; and in which the rear part of the lawn mower is automatically held down to the ground and the handle held up.

The accompanying drawing illustrates my invention.

Figure 1 is a perspective view, taken obliquely from the rear, of a lawn mower embodying my invention, with the cutting element set for rear cutting; Fig. 2 is a perspective view of such lawn mower taken from the right hand side; Fig. 3 is a view similar to Fig. 1, but showing the mower set for front cutting; Fig. 4 is a perspective view taken from the right hand side, showing the cutting element removed from the frame and the driving wheels in position in the frame; and Fig. 5 is a view showing the relative adjustment between the reel hanger and the cutter bar.

The driving wheels 10 are mounted in a frame which comprises a U-shaped bar 11 which extends across the rear of the machine and has forwardly and upwardly extending arms 11′ on the outside of the driving wheels 10; and curved bars 12 which are located on the inner sides of the driving wheels 10 and are connected to the arms 11′ by the shouldered ends of a cross brace and tie rod 13 which parallels the base of the U-shaped member 11 and is located slightly forward thereof, and has clamping nuts 14 on its ends. Handle-carrying bars 15 are pivoted to the curved bars 12 by bolts 16 and fixed to the usual operating handle 17 for the mower. The forward ends of the arms 11′ and curved bars 12 are in the axial line of the driving wheels 10, and each arm 11′ and its associated curved bar 12 are connected at such forward ends to the driving wheel 10 between them by a pivot bolt 18 passing through the center of such driving wheel. The driving wheels 10, however, are not mounted directly on the bolts 18, but are mounted on trunnions 20 which surround such bolts 18 and form part of cross bars 21 fixed to adjustment rings 22 which fit within the driving wheels 10 when the mower is assembled. The two cross bars 21 are interconnected near one end by a cross bar 23, and near the other by the shaft 24 of the cutting reel having the usual blades 25, such shaft 24 being journaled in such cross bars 21 and being provided on its ends with the usual ratchet pinions 26 which mesh with internal gears 27 on the driving wheels 10 when the mower is assembled, so that forward movement of the driving wheels 10 drives the reel 25 forward also. Thus the axis of the reel 25 is offset from the axis of the driving wheel 10. Each adjustment ring 22 is provided with a number of holes 28, arranged in two groups, and a screw or bolt 29 in the adjacent curved arm 12 may be made to coöperate with any of such holes 28, by swinging the reel hanger 21—22 on the pivot bolts 18. By the different holes 28 in the groups, the height of the cutting reel 25 from the ground may be varied to vary the length to which the grass is cut, and by the two groups of holes 28 the cutting reel 25 may be made to be in the rear of the line where the driving wheels 10 engage the ground, as shown in Figs. 1 and 2 and in full lines in Fig. 5, or in advance of such line, as shown in Fig. 3 and in dotted lines in Fig. 5. This provides for adjusting the mower to suit any desired conditions.

The ends of the cross bars 21 in which the shaft 24 is journaled are provided on their inner faces with an annular flange 30 concentric with the shaft 24 and with a disk-shaped flange 31. Cutter bar hangers 32 are provided with arc-shaped notches at their upper ends for fitting around the flanges 30, and carry screws 34 for fitting in different holes 35 in the flange 31 to maintain the cutter bar hangers 32 in substantially the same position with relation to the ground as the reel hanger 21—22 is changed in its different positions, as indicated in full and dotted lines in Fig. 5.

There may be any desired number of the holes 35, though I have shown but one for each group of the holes 28.

In the lower ends of the cutter bar hangers 32 is carried the cutter bar, which is shown as a half round steel bar 36 to which is screwed a steel blade 37 which coöperates with the blades 25 of the rotating wheel to cut the grass in the usual manner. The ends of the bar 36 are squared, and fixed on such squared ends by screws 38 are metal pieces 39 having front upwardly extending arms 40 and rear upwardly extending arms 41. The pieces 39 also have bearing extensions 42 which rotatably fit within holes in the lower ends of the cutter bar hangers 32, as is clear from Fig. 5. The outer face of each cutter bar hanger 32 is provided with a lug 43 (see Fig. 4), in which is a threaded hole to receive a screw 44, the forward end of which bears against the front arm 40 and the rear part of which passes through a vertical slot 45 in the rear arm 41 of the associated piece 39. A thimble or washer 46 surrounds the screw 44 and bears against the front face of the rear arm 41, being pressed rearwardly by a spring 47 acting between such thimble or washer and a nut 48 on the screw 44. The springs 47 act to throw the two pieces 39 and therefore the cutter bar 36—37 in the direction to bring the edge of such cutter bar upward against the blades of the reel 25, but the limit of such upward movement is adjusted by the screws 44 so that just the right pressure of the rotating blades on the cutter bar is obtained. If an obstacle is encountered, such as a nail which gets between the revolving blades and the cutter bar, the springs 47 allow the cutter bar to yield so that such obstacle does no damage. If desired, the nuts 48 may be adjusted to prevent such yielding, by being tightened to cause the coils of the springs 47 to engage one another solidly. This may be desired, for instance, in cutting very tough grass, when it is desired that the cutter bar shall not yield.

In order to prevent the rear of the machine from rising, and at the same time to hold the handle 17 raised, I provide yielding means interconnecting such rear end and such handle and pressing the former downward and the latter upward. In the form shown, compression springs 50 surround rods 51 which are pivoted at their lower ends to lugs 52 carried by the base of the U-shaped member 11 and provided with a number of holes for receiving the lower ends of such springs to adjust them. The upper ends of the bars 51 slide through abutments 53 against which the upper ends of the springs 50 bear, these abutments 53 being pivoted in supports 54 which in turn are mounted on the handle-carrying bars 15. By adjusting the lower ends of the springs 50 in the holes in the bars 51, the height of the operating handle 17 may be adjusted as desired, and the rear of the mower may be held down with any desired pressure.

Mounted in suitable bearings 55 on the U-shaped member 11 of the main frame is the shaft 56 of a rear roller 57, which is made in a plurality of sections, as is clear from Figs. 1 and 3. These sections can rotate independently, and thereby lessen the friction as the lawn mower is turned around corners.

The cutting element, which includes all the parts shown in the right hand half of Fig. 4, may be assembled and adjusted as a unit before being associated with the driving wheels and frame, shown in the left hand half of Fig. 4. This cutting unit can be adjusted around the trunnions 20 for cutting the grass either short or long, by putting the screws 29 in different ones of the holes 28; or for either front or rear cutting, by putting such screws in holes 28 in one or the other of the groups of such holes. The cutter bar may be adjusted around the axis of the cutting reel, to suit the adjustment of the latter around the trunnions 20. The cutter bar and cutter bar hangers may be removed, by first removing the screws 34, thus permitting the mower to be operated without cutting; as, for instance, for the purpose of sweeping the grass by means of brushes attached to the blades 25 into the ordinary grass-catcher which may be hung behind the mower.

I claim as my invention:

1. A lawn mower, comprising the combination of driving wheels, a reel hanger hung from the axis of said driving wheels, a cutting reel carried by said reel hanger and having its axis offset from the axis of the driving wheels, and a frame pivotally connected with the driving wheels at their axes, said frame interconnecting the driving wheels and having an offset ground-engaging portion for positioning it, and said reel hanger and cutting reel being rotatably adjustable about the axis of the driving wheels to different positions relative to the frame.

2. A lawn mower, comprising the combination of driving wheels, a reel hanger hung from the axis of said driving wheels, a cutting reel carried by said reel hanger and having its axis offset from the axis of the driving wheels, a frame pivotally connected with the driving wheels at their axes, said frame interconnecting the driving wheels and having an offset ground-engaging portion for positioning it, and means for attaching said reel hanger to said frame in different relative positions to vary the height of the abutting reel.

3. A lawn mower, comprising the combination of driving wheels, a reel hanger hung from the axis of said driving wheels, a cutting reel carried by said reel hanger and having its axis offset from the axis of the driving wheels, a frame pivotally connected with the driving wheels at their axes, and means for attaching said reel hanger to said frame with the cutting reel either in advance or in the rear of the vertical plane through the axis of the driving wheels.

4. A lawn mower, comprising the combination of driving wheels, a reel hanger hung from the axis of said driving wheels, a cutting reel carried by said reel hanger and having its axis offset from the axis of the driving wheels, a frame pivotally connected with the driving wheels at their axes, said reel hanger and cutting reel being rotatably adjustable about the axis of the driving wheels to different positions relative to the frame, and a cutter bar hung from said reel hanger and adjustable about the axis of the cutting reel.

5. A lawn mower, comprising the combination of driving wheel, a reel hanger hung from the axis of said driving wheels, a cutting reel carried by said reel hanger and having its axis offset from the axis of the driving wheels, a frame pivotally connected with the driving wheels at their axes, means for attaching said reel hanger to said frame with the cutting reel either in advance or in the rear of the vertical plane through the axis of the driving wheels, a cutter bar carried by said reel hanger, and means for fastening said cutter bar to the reel hanger in different relative positions angularly about the axis of the cutting reel, so that the cutter bar bears the proper relation to the cutting reel and the ground both when the cutting reel is in advance of and in the rear of such vertical plane.

6. A lawn mower, comprising the combination of a rotating cutting reel, a cutter bar coöperating with said cutting reel, a support in which said cutter bar is pivoted so that its edge may swing to and from the cutting reel, a pair of arms fixed on said cutter bar, a screw adjustably mounted in said support and bearing against one of said arms, a nut on said screw, and a compression spring surrounding said screw and bearing against said nut and said second arm for forcing the edge of said cutter bar toward the cutting reel.

7. A lawn mower, comprising the combination of a rotating cutting reel, a cutter bar coöperating with said cutting reel, a support in which said cutter bar is pivoted so that its edge may swing to and from the cutting reel, a pair of arms fixed on said cutter bar, a screw adjustably mounted in said support and bearing against one of said arms, and a compression spring surrounding said screw and bearing against said second arm for forcing the edge of said cutter bar toward the cutting reel.

8. A lawn mower, comprising the combination of a pair of supporting wheels, a frame pivotally connected to said supporting wheels at the axis thereof and interconnecting them, said frame having an offset ground-engaging portion for positioning it, and a cutting element which, as a unit is hung from said frame on the axis of said supporting wheels, said cutting unit including a reel the axis of which is offset from the axis of said supporting wheels and being rotatably adjustable about the axis of said supporting wheels to vary the position of said cutting reel.

9. A lawn mower, comprising the combination of a pair of supporting wheels, a frame pivotally connected to said supporting wheels at the axis thereof and interconnecting them, said frame having an offset ground-engaging portion for positioning it, and a cutting element which as a unit is hung from said frame on the axis of said supporting wheels.

10. A lawn mower, comprising the combination of a pair of supporting wheels, a frame to which said wheels are pivotally connected, said frame interconnecting said supporting wheels and having an offset ground-engaging portion for positioning it, cutting devices carried by said frame and adjustable relatively thereto, a handle pivoted to said frame, and springs acting between said handle and the rear of said frame for forcing the handle upward and the rear of said frame downward.

11. A lawn mower, comprising the combination of supporting wheels, a frame to which said wheels are pivotally connected at their axes, a cutting reel carried by said frame, a cutter bar coöperating with said cutting reel, and supporting means for said cutter bar removably attachable to said frame in any of a plurality of different angular positions about the axis of the cutting reel, so that said supporting means and cutter bar may be rotatably adjusted about the axis of the cutting reel.

12. A lawn mower, comprising the combination of a rotating cutting reel, a cutter bar coöperating with said cutting reel, a support in which said cutter bar is pivoted so that its edge may swing to and from the cutting reel, a pair of arms fixed on said cutter bar, a screw adjustably mounted in said support and bearing against one of said arms, a nut on said screw, and a compression spring surrounding said screw and bearing against said nut and said second arm for forcing the edge of said cutter bar toward the cutting reel, said nut being adjustable along said screw to vary the compression of said spring and to cause the coils of the spring to engage one another solidly.

13. A lawn mower, comprising the combination of a pair of supporting wheels, a frame pivotally connected to said supporting wheels at the axis thereof and interconnecting them, said frame having an offset ground-engaging portion for positioning it, and a cutting element which as a unit is hung from said frame on the axis of said supporting wheels, said cutting unit including a cutting reel the axis of which is offset from the axis of said supporting wheels and a cutter bar which is adjustable about the axis of said reel, said cutting unit being rotatably adjustable as a whole relatively to the frame about the axis of said supporting wheels.

In witness whereof, I HERBERT J. FARMER have hereunto set my hand at Richmond, Indiana, this 13th day of August 1915, A. D. one thousand nine hundred and fifteen.

HERBERT J. FARMER.